United States Patent
Petkar et al.

(10) Patent No.: US 12,214,903 B2
(45) Date of Patent: Feb. 4, 2025

(54) APPARATUS FOR AND A METHOD OF DEICING A DUCTED FAN ENGINE

(71) Applicant: General Electric Company, Schenectady, NY (US)

(72) Inventors: Kirti Petkar, Bengaluru (IN); Sesha Subramanian, Bengaluru (IN); Nicholas J. Kray, Mason, OH (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/152,906

(22) Filed: Jan. 11, 2023

(65) Prior Publication Data
US 2024/0076059 A1 Mar. 7, 2024

(30) Foreign Application Priority Data
Sep. 1, 2022 (IN) .............................. 202211049933

(51) Int. Cl.
*B64F 1/36* (2024.01)
*B08B 7/02* (2006.01)
(Continued)

(52) U.S. Cl.
CPC ............... *B64F 1/36* (2013.01); *B08B 7/026* (2013.01); *B08B 13/00* (2013.01); *G06T 7/0002* (2013.01); *G06T 2207/10048* (2013.01)

(58) Field of Classification Search
CPC ......... B08B 13/00; B08B 7/026; B64D 15/20; B64F 1/36; B64F 5/27; G06T 2207/10048; G06T 7/0002
See application file for complete search history.

(56) References Cited

U.S. PATENT DOCUMENTS

| 8,733,688 B2 | 5/2014 | Gantie et al. |
| 9,777,591 B2 | 10/2017 | Tine et al. |

(Continued)

FOREIGN PATENT DOCUMENTS

| CA | 3181241 A1 * | 12/2021 | ............. B64D 43/00 |
| CN | 110816855 A * | 2/2020 | ............. B64D 15/16 |

(Continued)

OTHER PUBLICATIONS

Machine translation of CN214729777U (Year: 2021).*
Machine translation of CN110816855A (Year: 2020).*

*Primary Examiner* — Douglas Lee
(74) *Attorney, Agent, or Firm* — Venable LLP; Edward A. Kmett; Michele V. Frank

(57) ABSTRACT

A ducted fan engine is deiced using a ground support deicing apparatus having a support structure, a plurality of sonic wave transmitters, an imaging device, and a controller that controls the sonic wave transmitters to emit sonic waves at varying frequencies. A deicing program causes the controller to control (a) providing imaging signals to obtain image data from imaging sensors, (b) receiving image data provided by each of the imaging sensors, and generates images of at least one component part of the engine, (c) detecting a presence or an absence of ice on the at least one component part of the engine, and (d) controlling the plurality of sonic wave transmitters to emit sonic waves in a given frequency range so as to remove the ice from the component part of the engine.

20 Claims, 7 Drawing Sheets

(51) Int. Cl.
*B08B 13/00* (2006.01)
*G06T 7/00* (2017.01)

(56) References Cited

U.S. PATENT DOCUMENTS

| | | |
|---|---|---|
| 9,821,915 B2 | 11/2017 | Giles et al. |
| 10,118,706 B2 | 11/2018 | Hull et al. |
| 10,823,060 B2 | 11/2020 | Schwarz et al. |
| 10,883,380 B2 | 1/2021 | Roberge |
| 2011/0280723 A1 | 11/2011 | Libergren |

FOREIGN PATENT DOCUMENTS

| | | | |
|---|---|---|---|
| CN | 214729777 U | * | 11/2021 |
| FR | 2998921 A1 | | 6/2014 |
| WO | 2014209665 A1 | | 12/2014 |

* cited by examiner

APPARATUS FOR AND A METHOD OF DEICING A DUCTED FAN ENGINE

CROSS REFERENCE TO RELATED APPLICATIONS

The present application claims the benefit of Indian Patent Application No. 202211049933, filed on Sep. 1, 2022, which is hereby incorporated by reference herein in its entirety.

TECHNICAL FIELD

The present disclosure relates to an apparatus for and a method of deicing a ducted fan engine.

BACKGROUND

Some ducted fan engines, such as gas turbine engines, generally include a nacelle that surrounds a fan assembly and a core engine. The nacelle includes an inlet duct upstream of the fan assembly and a bypass flow passage downstream of the fan assembly. The nacelle is supported by fan outlet guide vanes, or struts, connected with the core engine. The core engine includes a booster or a low pressure compressor that includes booster inlet guide vanes. Under cold conditions (e.g., temperatures at or below freezing), after shutdown of the ducted fan engine while the aircraft is on the ground, or while the engine has been sitting idle for an extended period of time while the aircraft is on the ground and not operating, ice build up may occur on various component parts of the ducted fan engine. For example, ice may build up on an inlet lip or on an inner surface of an inlet duct of the nacelle, or may build up on fan blades or a spinner of the fan assembly. Further, ice buildup may occur on an inner surface of the bypass flow passage, on the fan outlet guide vanes (or struts), or on the inlet guide vanes of the booster.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
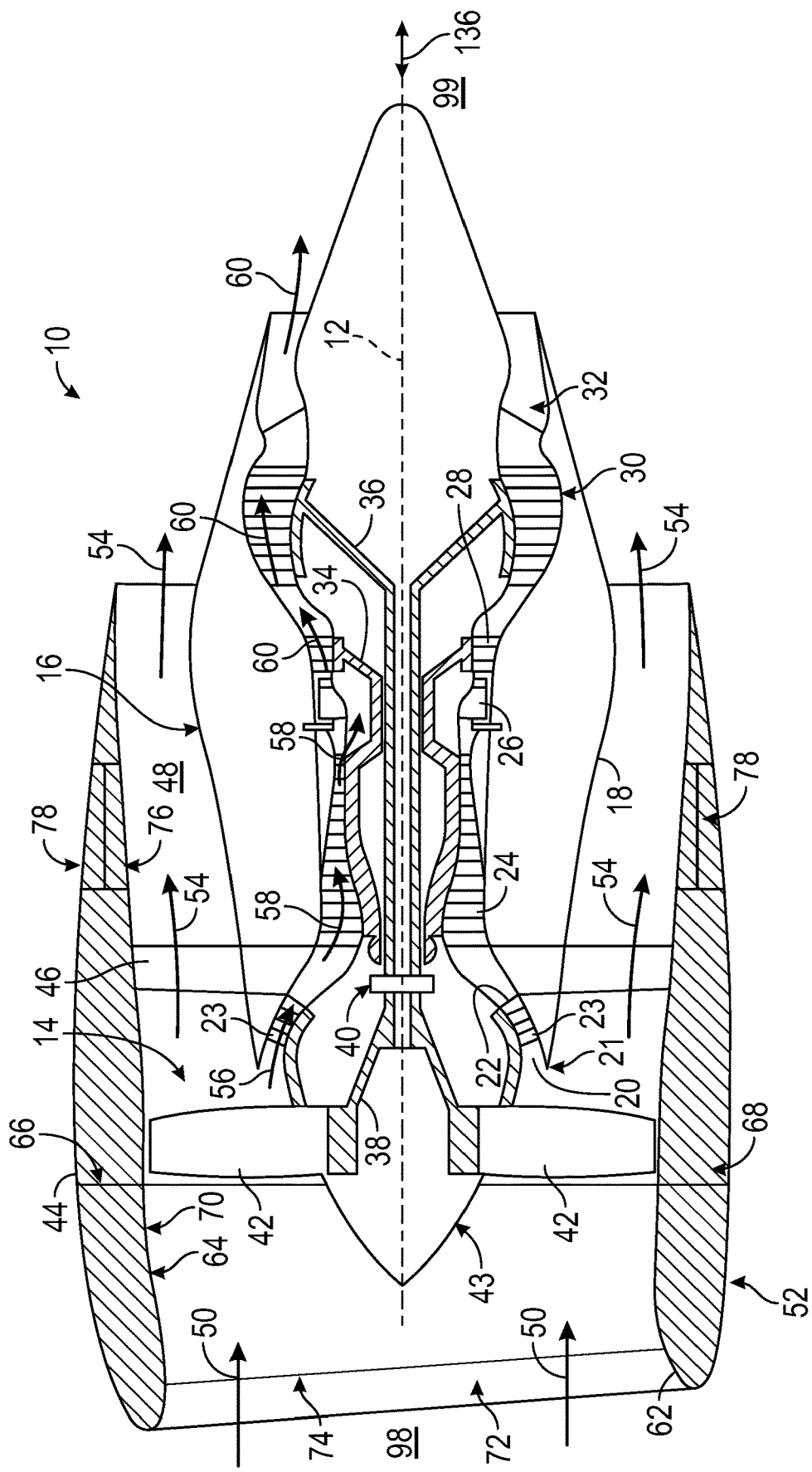
FIG. 1 is a schematic partial cross-sectional side view of an exemplary high by-pass turbofan jet engine, according to an aspect of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first" or "second" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Some ducted fan engines, such as gas turbine engines, generally include a nacelle that surrounds a fan assembly and a core engine. The nacelle includes an inlet duct upstream of the fan assembly and a bypass flow passage downstream of the fan assembly. The nacelle is supported by fan outlet guide vanes, or struts, connected with the core engine. The core engine includes a booster or low pressure compressor that includes booster inlet guide vanes. Under cold conditions (i.e., temperatures at or below freezing), after shutdown of the ducted fan engine while the aircraft is on the ground, or while the engine has been sitting idle for an extended period of time while the aircraft is on the ground and not operating, ice buildup may occur on various component parts of the ducted fan engine. For example, ice may build up on an inlet lip or on an inner surface of an inlet duct of the nacelle, or may build up on fan blades or a spinner of the fan assembly. Further, ice buildup may occur on an inner surface of the bypass flow passage, on the fan outlet guide vanes (or struts), or on the inlet guide vanes of the booster. Some of the ice buildup may be considered as "black ice," which may be difficult to detect by ground support personnel prior to startup of the ducted fan engine.

The present disclosure provides a method of and an apparatus for deicing various component parts of the ducted fan engine in ground idle-state (non-operational) conditions. According to the present disclosure, a technique for deicing a ducted fan engine utilizes a ground support deicing apparatus for the ducted fan engine, where the ground support deicing apparatus includes a support structure to which a plurality of sonic wave transmitters are connected, an imaging device, and a controller that controls the plurality of sonic wave transmitters to emit sonic waves at varying frequencies. The ground support deicing apparatus may be mounted to a ground support vehicle, such as an external auxiliary power unit or an aircraft tow vehicle, or may be a handheld apparatus operable by ground support personnel. In deicing the ducted fan engine, the support structure is inserted into an inlet duct of a nacelle of the ducted fan engine, and may be translated through the inlet duct and/or rotated within the inlet duct. The imaging device, which may be an infrared imaging device that includes sensors, provides imaging feedback of a surface of at least one component part of the ducted fan engine to detect the presence of ice on the component part. The controller controls the plurality of sonic wave transmitters to emit sonic waves in a given frequency range (e.g., between eight kilohertz and two hundred kilohertz) based on (a) the imaging feedback of the imaging device, (b) feedback from the plurality of sonic wave transmitters, and (c) a type of the component part of the ducted fan engine, to deice the at least one component part. As a result, ice buildup that may occur on the ducted fan engine component parts can be readily broken-up and removed from the surfaces of the component parts via the sonic waves.

Referring now to the drawings, FIG. 1 is a schematic partial cross-sectional side view of an exemplary high by-pass turbofan jet engine 10, herein referred to as "engine 10," as may incorporate various embodiments of the present disclosure. Although further described below with reference to a turbofan engine, the present disclosure is also applicable to turbomachinery in general, including turbojet and turboshaft gas turbine engines, or ducted fan engines that have an electrically-driven fan, including marine-based turbine engines, industrial turbine engines, and auxiliary power units. As shown in FIG. 1, the engine 10 has an axial centerline axis 12 that extends therethrough from an upstream end 98 of the engine 10 to a downstream end 99 of the engine 10 for reference purposes. In general, the engine 10 may include a fan assembly 14 and a core engine 16 disposed downstream from the fan assembly 14.

The core engine 16 may more generally be referred to herein as a drive mechanism, which may include, for example, a gas turbine engine or an electric motor. A gas turbine, however, will be described herein in more detail as constituting the core engine 16. The core engine 16 may generally include an outer casing 18 that defines an annular inlet 20. The outer casing 18 encases, or at least partially forms, in serial flow relationship, the core engine 16 having a compressor section (22/24) having a low pressure (LP) compressor 22 and a high pressure (HP) compressor 24, a combustor 26, a turbine section (28/30) including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. The fan assembly 14 may also include a spinner 43. An annular fan casing or a nacelle 44 circumferentially surrounds the fan assembly 14 and/or at least a portion of the core engine 16. The nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 between the outer casing 18 of the core engine 16 and a bypass duct inner surface 76 of the nacelle 44. The nacelle 44 may also include access doors 78 to allow access to the bypass airflow passage 48.

During operation of the engine 10, as shown in FIG. 1, a volume of air, as indicated schematically by arrows 50, enters the engine 10 through an inlet 74 of an inlet duct 52 of the nacelle 44 from the upstream end 98. As the air 50 passes across the fan blades 42, a portion of the air 50 is directed or routed into the bypass airflow passage 48 as a bypass airflow 54, while another portion of the air 50 is split by a low pressure compressor splitter 21 and directed or routed into the annular inlet 20, and through low pressure compressor inlet guide vanes 23 into the LP compressor 22 as a compressor inlet air 56. The compressor inlet air 56 is progressively compressed as it flows through the LP compressor 22 and the HP compressor 24 towards the combustor 26. Compressed air 58 flows into the combustor 26, where it is mixed with fuel and ignited to generate combustion gases 60. The combustion gases 60 flow into the HP turbine 28, thus causing the HP rotor shaft 34 to rotate, thereby supporting operation of the HP compressor 24. The combustion gases 60 are then routed through the LP turbine 30, thus causing the LP rotor shaft 36 to rotate, thereby supporting operation of the LP compressor 22 and/or rotation of the fan shaft 38. The combustion gases 60 are then exhausted through the jet exhaust nozzle section 32 of the core engine 16 to provide propulsion at the downstream end 99.

The inlet duct 52 may generally extend from a highlight 72 to a fan interface 66 of a fan section 68. The inlet duct 52 may include an inlet lip 62 and an acoustic liner 64 that extends between the inlet lip 62 and the fan interface 66, and includes an inner surface 70 that extends circumferentially about the axial centerline axis 12 and extends from the highlight to the fan interface 66.

Figure 2:
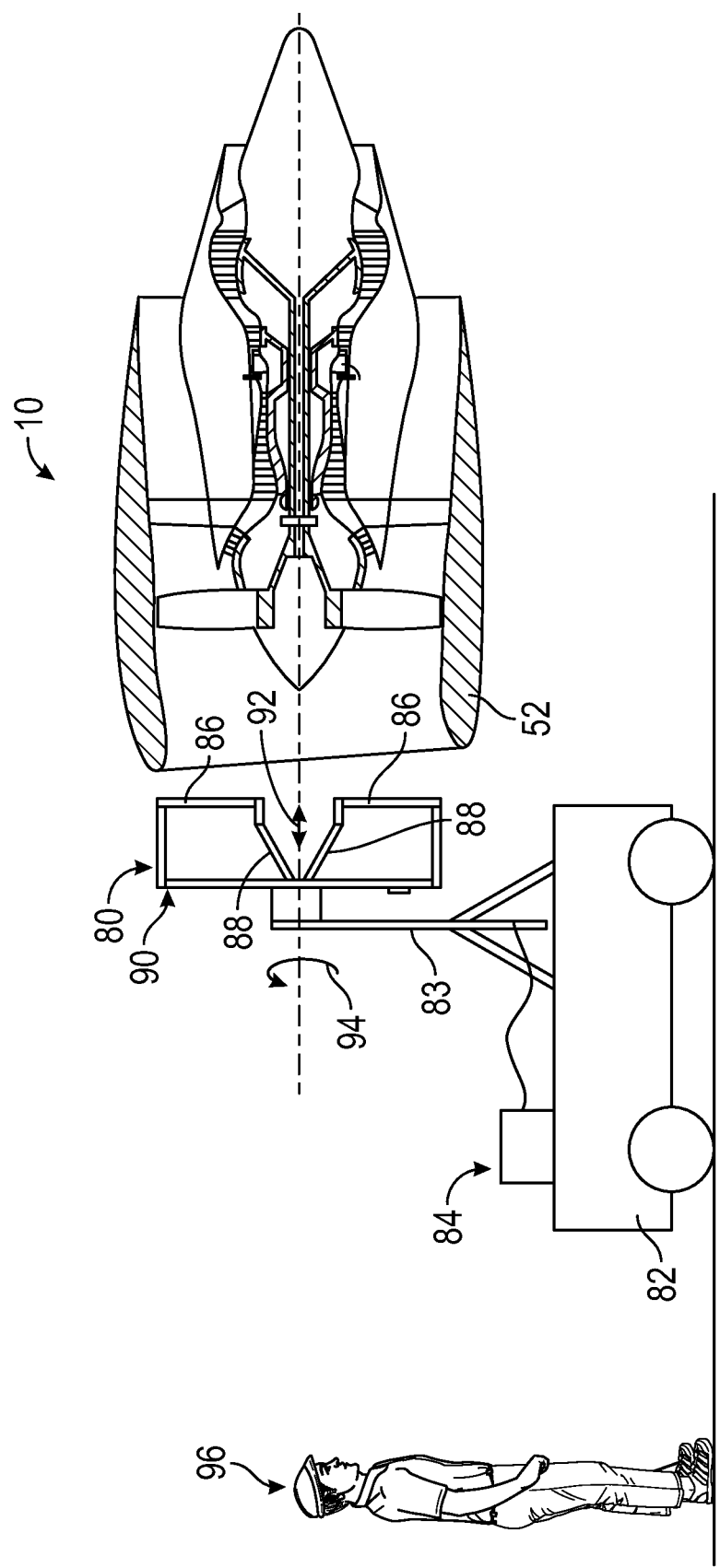
FIG. 2 depicts an example of a ground support deicing apparatus connected with a ground support vehicle, according to an aspect of the present disclosure.
Figure 3:
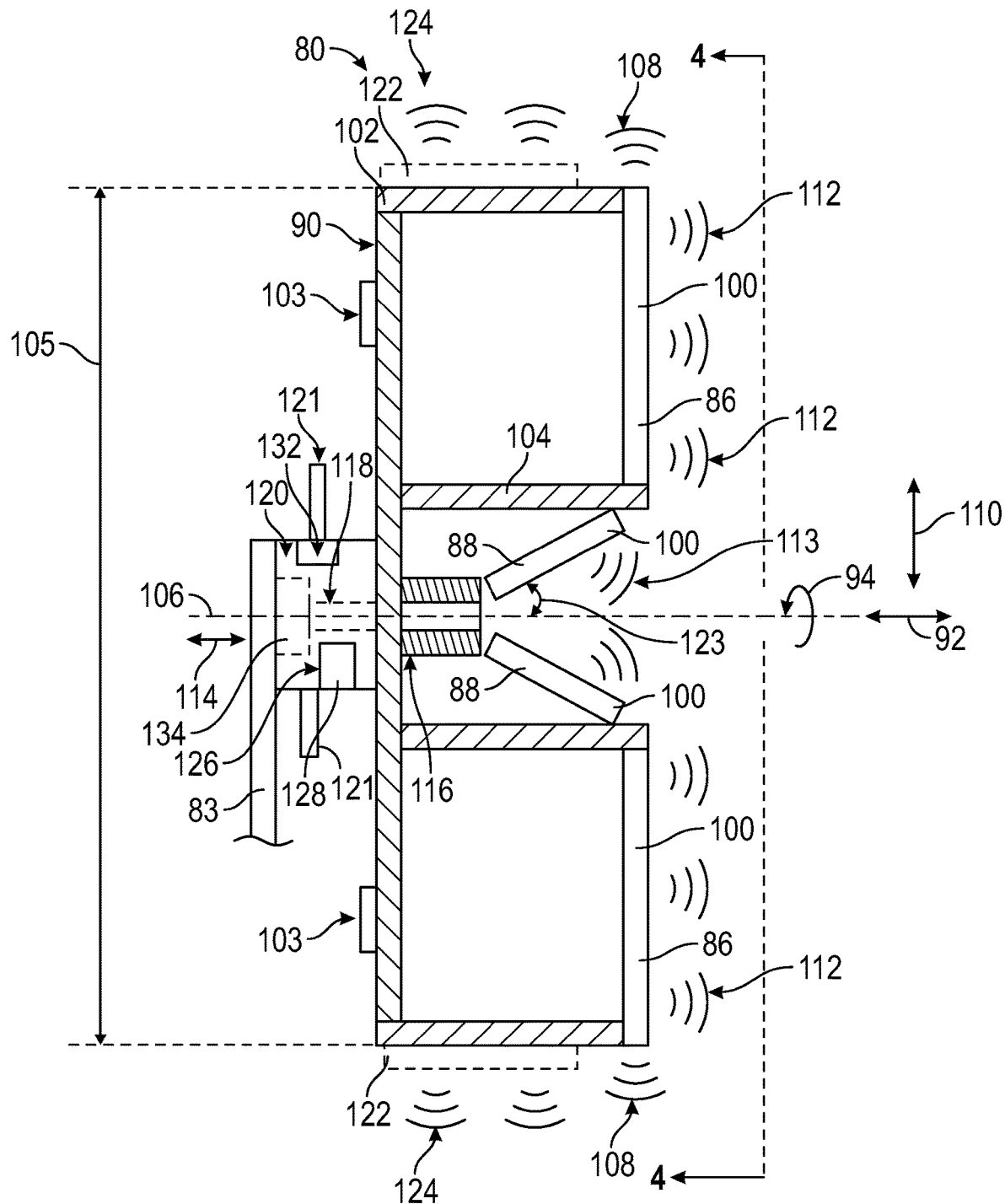
FIG. 3 is a cross-sectional view of an exemplary ground support deicing apparatus, according to an aspect of the present disclosure.

FIG. 2 depicts an example of a ground support deicing apparatus 80 connected with a ground support vehicle 82 via a support stand 83, according to an aspect of the present disclosure. Briefly, as shown in FIG. 2, and as will be described in more detail below, the ground support deicing apparatus 80 includes a support structure 90 to which a plurality of first sonic wave transmitters 86 and a plurality of second sonic wave transmitters 88 are connected. The ground support deicing apparatus 80 is capable of being translated in an axial translation direction 92 and in a circumferential translation direction 94. A power source 84 may be connected to the ground support deicing apparatus 80 to provide power to operate the ground support deicing apparatus 80. While FIG. 2 depicts the ground support deicing apparatus 80 as being connected to the ground support vehicle 82, the ground support deicing apparatus 80 may instead be a handheld apparatus in which a ground support personnel 96 can manually handle the ground support deicing apparatus 80 via, for example, handholds 121 (FIG. 3). That is, the ground support personnel 96 may manually manipulate and operate the ground support deicing apparatus 80 instead of the ground support deicing apparatus 80 being mounted to the ground support vehicle 82 via the support stand 83. In addition, other implementations of the ground support deicing apparatus 80 may be provided, such as a ground mounted ground support deicing apparatus 80 in which an aircraft may be positioned in front of to perform the deicing operations.

Figure 4:
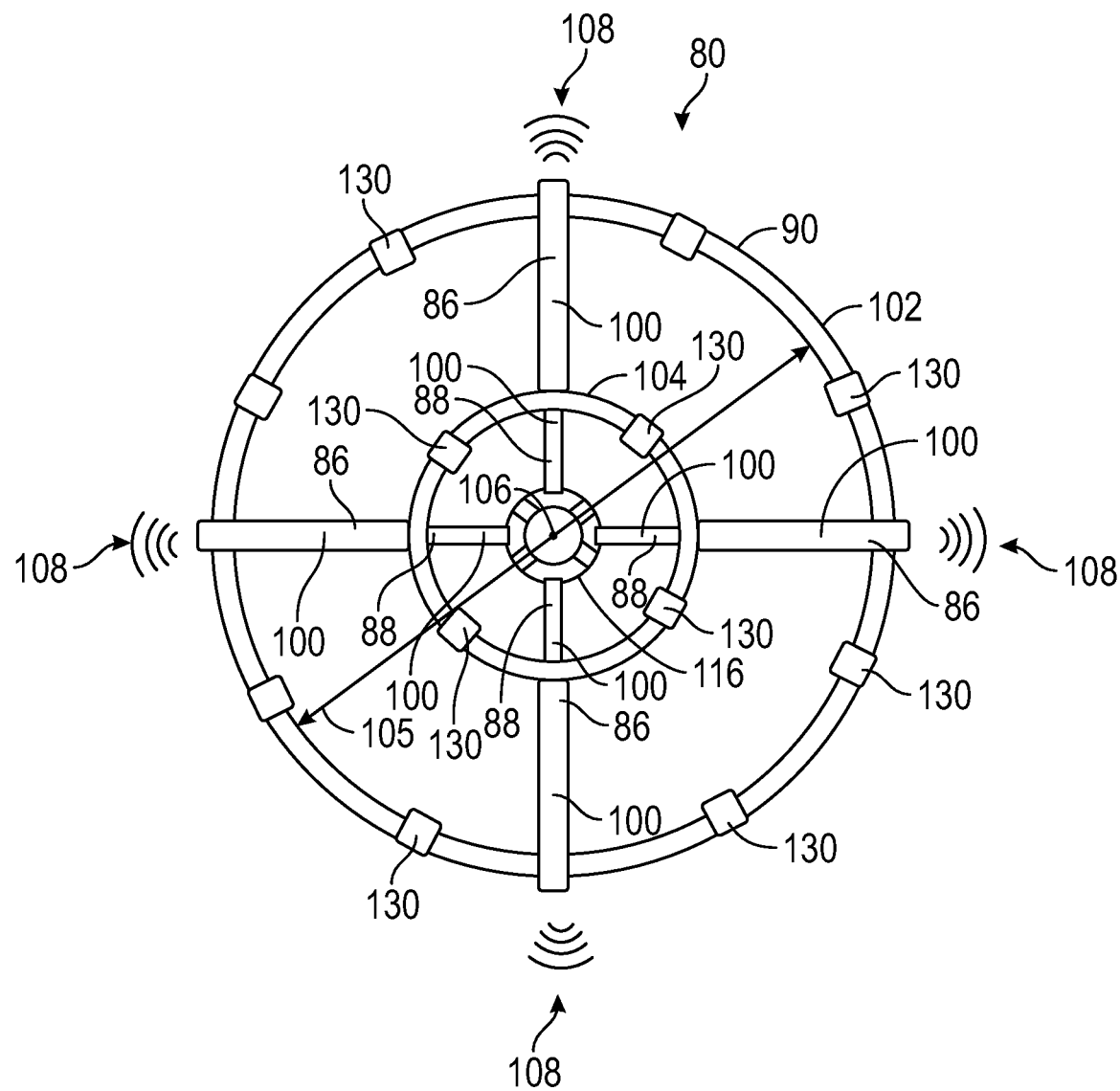
FIG. 4 is an elevational view of the exemplary ground support deicing apparatus, taken at view 4-4 of FIG. 3, according to an aspect of the present disclosure.

FIG. 3 is a cross-sectional view of an exemplary ground support deicing apparatus 80 according to an aspect of the present disclosure. FIG. 4 is an elevational view of the exemplary ground support deicing apparatus 80, taken at view 4-4 of FIG. 3. As shown collectively in FIG. 3 and FIG. 4, the ground support deicing apparatus 80 includes the support structure 90, and also includes a plurality of sonic wave transmitters 100 connected to the support structure 90.

The support structure 90 may include a first circumferential structure 102 that may define a centerline axis 106. The first circumferential structure 102 may include one or more mechanical adjustment devices 103 that provide the ability to adjust a diametric size 105 of a diameter of the first circumferential structure 102. Thus, by adjusting the diametric size 105, the ground support deicing apparatus 80 may be implemented in a wide variety of engine sizes. The support structure 90 may also include a second circumferential structure 104 inward of, and coaxial with, the first circumferential structure 102. The plurality of sonic wave transmitters 100 may include the first sonic wave transmitters 86 and the second sonic wave transmitters 88. The first sonic wave transmitters 86 may be connected to the first circumferential structure 102, or may be connected with both the first circumferential structure 102 and the second circumferential structure 104. While FIG. 4 depicts four first sonic wave transmitters 86 being implemented in the ground support deicing apparatus 80, more than four or fewer than four first sonic wave transmitters 86 may be implemented instead. The first sonic wave transmitters 86 may be configured to emit sonic waves 108 in a radial direction 110 and/or to transmit sonic waves 112 in an axial direction 114. The second sonic wave transmitters 88 may be configured to emit sonic waves 113 generally orthogonal to the second sonic wave transmitter 88. The emission of the sonic waves 108 in the radial direction 110 provides for the first sonic wave transmitters 86 to emit the sonic waves 108 against the inner surface 70 of the inlet duct 52, while the emission of the sonic waves 112 in the axial direction provides for the first sonic wave transmitters 86 to emit the sonic waves 112 toward the fan blades 42 of the fan assembly 14. The emission of the sonic waves 113 orthogonal to the second sonic wave transmitters 88 provides for emitting the sonic waves 113 against a contoured surface of the spinner 43. Of course, each of the first sonic wave transmitters 86 may emit sonic waves in a generally conical or a cylindrical pattern and therefore, reference to emitting the sonic waves 108 in the radial direction 110 may refer to emitting a conical shaped pattern of sonic waves generally in the radial direction 110. The same may apply to the sonic waves 112 and the sonic waves 113 in that the sonic waves 112 and/or the sonic waves 113 may be emitted in a generally conical shaped pattern or a cylindrical shaped pattern. The first sonic wave transmitters 86 may also be arranged to emit the sonic wave 108 and the sonic waves 112 in any other direction and is not limited to the radial direction 110 or the axial direction 114. Similarly, the second sonic wave transmitters 88 may be arranged to emit the sonic wave 113 in any other direction.

The second sonic wave transmitters 88 may be connected to the second circumferential structure 104, and may also be connected with an adjustable structure portion 116. The adjustable structure portion 116 may be actuated by an actuator 118 within a control box 120 so as to expand and/or contract in the radial direction 110 to adjust an angle 123 of the second sonic wave transmitters 88. That is, the second sonic wave transmitters 88 may be angularly adjustable with respect to the centerline axis 106 so as to adjust to a profile of the spinner 43 of the fan assembly 14 as the ground support deicing apparatus 80 is inserted into the inlet duct 52 of the nacelle 44. While FIG. 4 depicts four second sonic wave transmitters 88 being implemented in the ground support deicing apparatus 80, more than four or fewer than four second sonic wave transmitters 88 may be implemented instead.

In an alternative arrangement, as shown in FIG. 3, a plurality of third sonic wave transmitters 122 (shown with dashed lines) may be connected to the first circumferential structure 102. While the first sonic wave transmitters 86 are arranged to extend in the radial direction 110, the third sonic wave transmitters 122 may be arranged to extend in the axial direction 114 so as to provide a greater axial coverage area of sonic waves 124 emitted therefrom. The third sonic wave transmitters 122 may be implemented in conjunction with the first sonic wave transmitters 86 and the second sonic wave transmitters 88.

Referring again to FIG. 3 and FIG. 4 collectively, the ground support deicing apparatus 80 also includes an imaging device 126, which may be an infrared imaging device, and may include an image processing circuit 128 within the control box 120 and a plurality of infrared (IR) imaging sensors 130 that communicate with the image processing circuit 128. The IR imaging sensors 130 may be connected to one or both of the first circumferential structure 102 and/or the second circumferential structure 104.

Figure 5:
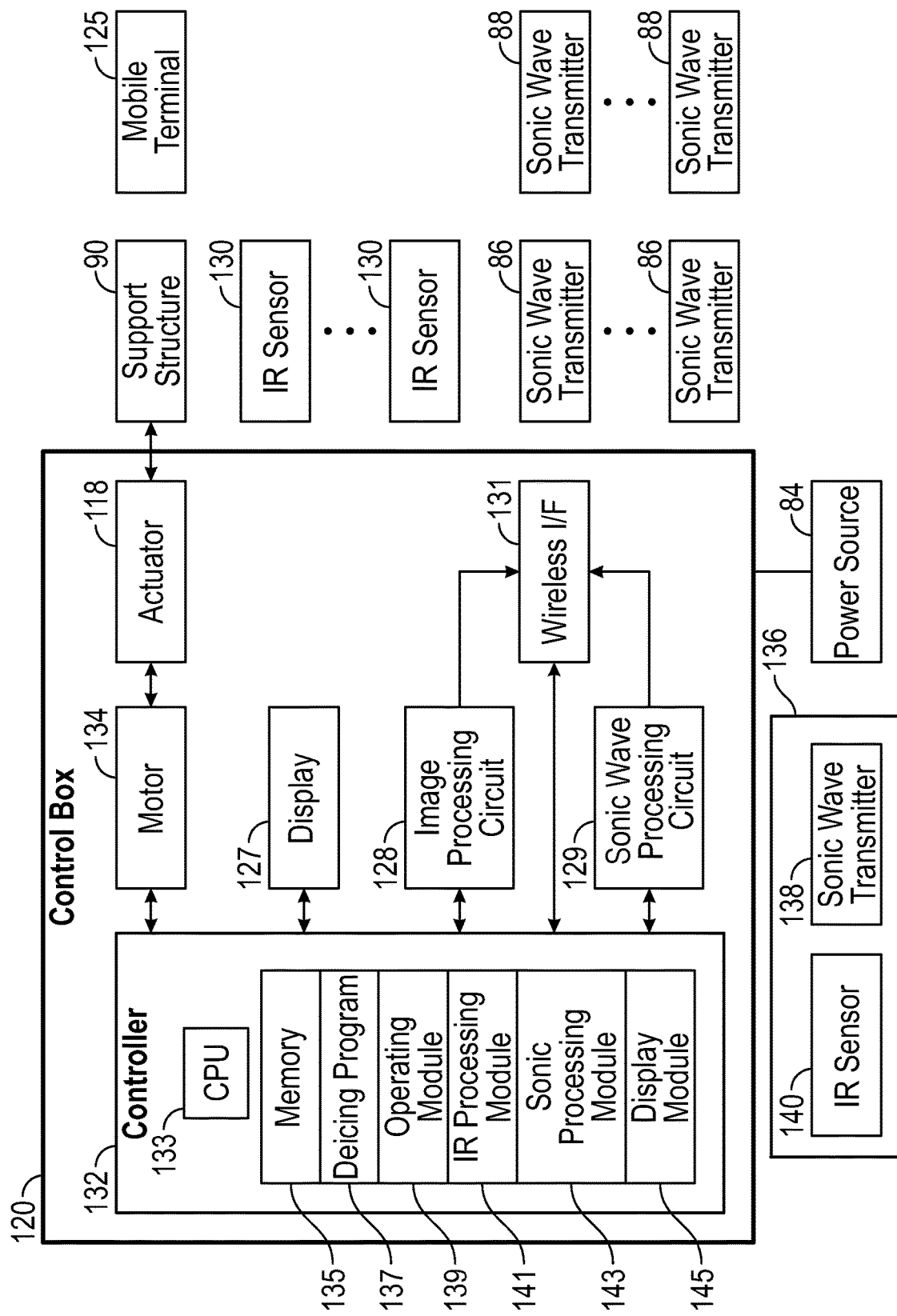
FIG. 5 is a schematic diagram of components of a control box for a ground support deicing apparatus, according to an aspect of the present disclosure.

FIG. 5 is a schematic diagram of various exemplary components of the control box 120 for controlling operation of the ground support deicing apparatus 80, according to an aspect of the present disclosure. As shown in FIG. 5, the control box 120 may include a controller 132. The controller 132 may be a computer processing circuit that includes a central processing unit (CPU) 133 and a memory 135 that stores computer-executable instructions of a deicing program 137 for operating the ground support deicing apparatus 80. The deicing program 137 may include various software modules, including an operating module 139, an IR (Infrared) processing module 141, a sonic processing module 143, and a display module 145. The controller 132 may control the actuator 118, via the operating module 139. The actuator 118 may be a combination actuator that includes additional actuation functionality. For example, the actuator 118 may include an axial extending mechanism (e.g., a jackscrew-type mechanism, not shown) that, when operated by a motor 134, drives the support structure 90 in an axial translation direction 92 (FIG. 3). The actuator 118 may further include a rotational mechanism (not shown) that, when operated by the motor 134, rotates the support structure 90 in a circumferential translation direction 94 (FIG. 3).

The control box 120 may also include the image processing circuit 128 and a sonic wave processing circuit 129, each of which communicate with the controller 132 and also communicate with a wireless interface 131. The image processing circuit 128 may communicate with each of the IR imaging sensors 130 and an IR sensor 140 of a second support structure 136 (described below) via the wireless interface 131, and the image processing circuit 128 may communicate with the IR processing module 141 to send/receive data/signals between the image processing circuit 128 and the IR processing module 141. Similarly, the sonic wave processing circuit 129 may communicate with each of the sonic wave transmitters 86, the sonic wave transmitters 88, and a sonic wave transmitter 138 (described below) via the wireless interface 131, and the sonic wave processing circuit 129 may communicate with the sonic processing module 143 to send/receive data/signals between the sonic wave processing circuit 129 and the sonic processing module 143. The control box 120 may further include a display 127 that communicates with a display module 145 to display various data and/or images of component parts of the engine 10 that are generated by the deicing program 137. Alternatively, the display module 145 may communicate wirelessly with a mobile terminal 125 via the wireless interface 131, and the mobile terminal 125 may include a display upon which the data/images are displayed for the ground support personnel 96 to view. The mobile terminal 125 may include, for example, an application program that communicates with the deicing program 137 so that the ground support personnel 96 may input commands to operate the deicing program 137.

In operation of the ground support deicing apparatus 80, the IR processing module 141 provides imaging signals to the image processing circuit 128 to obtain infrared image data from the IR imaging sensors 130 and the IR sensor 140. The image processing circuit 128 communicates with the IR imaging sensors 130 and the IR sensor 140 to receive the infrared image data from each of the IR imaging sensors 130 and the IR sensor 140. The image processing circuit 128 provides the received infrared image data to the IR processing module 141, which may then generate infrared images of the component parts of the engine 10 and provide the infrared images to the display module 145 for display on the display 127 or on the mobile terminal 125. In addition, the IR processing module 141 may utilize the infrared image data to detect the presence or the absence of ice on the component parts of the engine 10, to detect a thickness of any ice that may be present on the component parts, and to identify the various component parts of the engine 10 from the infrared image data.

The IR processing module 141, upon detecting the presence of ice on a component part of the engine 10, detecting the thickness of the ice on the component part, and identifying the component part, provides such data to the sonic processing module 143. The sonic processing module 143, upon receiving the data from the IR processing module 141, determines which of the plurality of the sonic wave transmitters 86, and/or the plurality of the sonic wave transmitters 88, and/or the plurality of sonic wave transmitters 122 are to be activated to emit the sonic waves 108, the sonic waves 112, the sonic waves 113, and/or the sonic waves 124. In addition, the sonic processing module determines a frequency of the sonic waves to be transmitted. Generally, the frequency of the sonic waves may be in a range from about eight kilohertz (KHz) to about two hundred kilohertz (KHz). However, the sonic waves are not limited to the foregoing range and other frequencies may be implemented instead. The sonic processing module 143 then provides sonic wave transmission signals to the sonic wave processing circuit 129, which in turn provides sonic wave transmission signals to the determined sonic wave transmitters 86 and/or the sonic wave transmitters 88, and/or the sonic wave transmitter 138. The sonic wave transmitters 86, the sonic wave transmitters 88, the sonic wave transmitters 122, and/or the sonic wave transmitter 138 emit the sonic waves 108, the sonic waves 112, the sonic waves 113, and/or the sonic waves 124 to remove the detected ice from the component part(s) of the engine 10. The sonic wave transmitters 86, the sonic wave transmitters 88, the sonic wave transmitters 122, and/or the sonic wave transmitter 138 provide feedback sonic data to the sonic wave processing circuit 129 while emitting the sonic waves, and the sonic wave processing circuit 129 provides the feedback data to the sonic processing module 143. Similarly, the IR imaging sensors 130 and/or the IR sensor 140 provide continuous feedback image data (e.g., updated image data) to the image processing circuit 128, which provides the feedback image data to the IR processing module 141. As will be described in more detail below with regard to FIG. 6, the deicing program 137 implements a continuous loop of processing the feedback image data and the feedback sonic data by the IR processing module 141 and the sonic processing module 143 to deice the engine 10.

Figure 6:
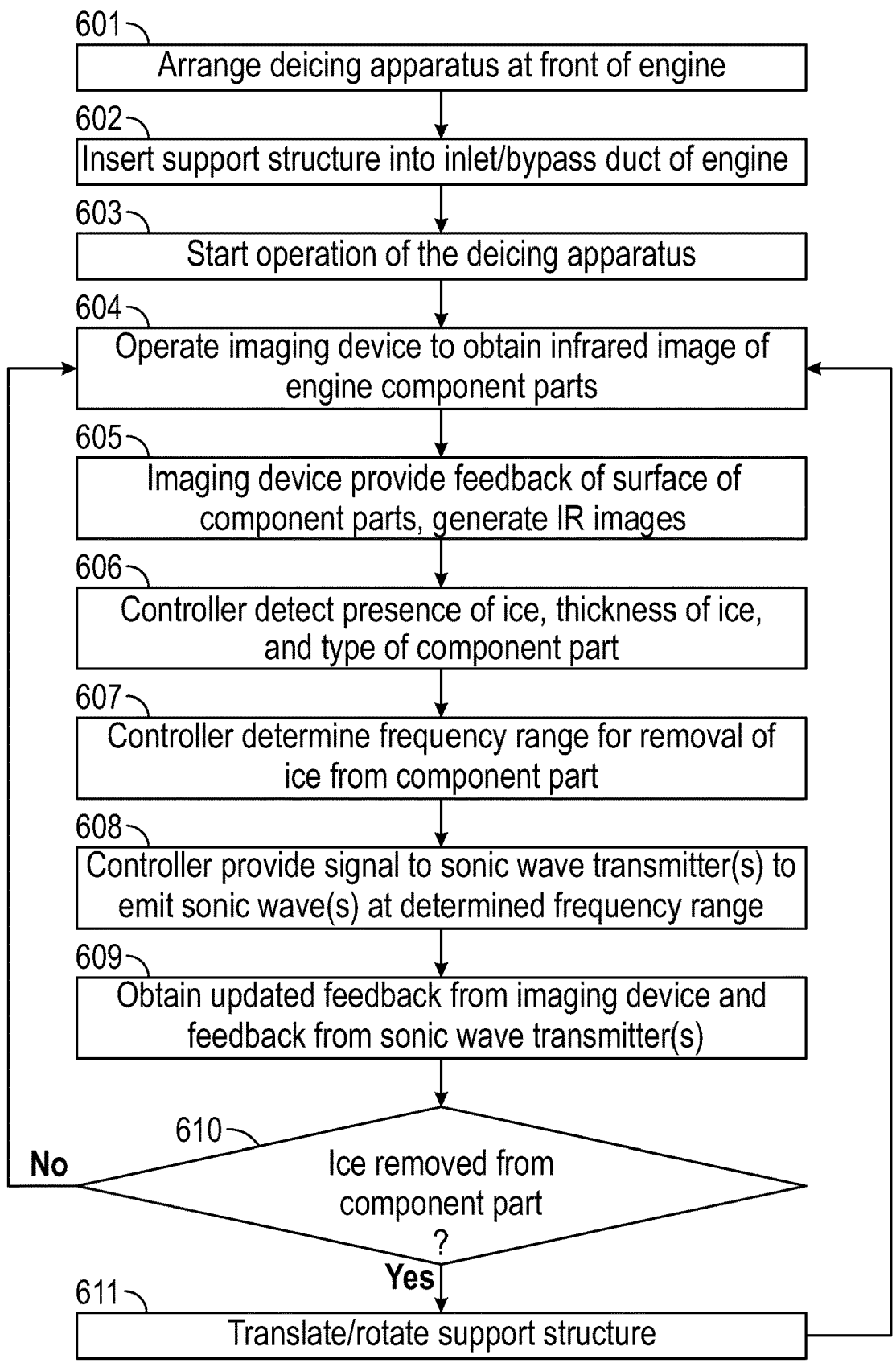
FIG. 6 is a flowchart of process steps of a method of deicing a ducted fan engine utilizing a ground support deicing apparatus, according to an aspect of the present disclosure.

FIG. 6 is a flowchart of process steps for a method of deicing a ducted fan engine utilizing the ground support deicing apparatus 80, according to an aspect of the present disclosure. In step 601, the ground support deicing apparatus 80 is arranged at the front of the engine 10, and, in particular, is arranged to be aligned with the inlet duct 52. For example, in the case where the ground support deicing apparatus 80 is mounted to the ground support vehicle 82 as shown in FIG. 2, the ground support deicing apparatus 80 may be arranged in front of the inlet duct 52 and aligned so that the centerline axis 106 (FIG. 3) is generally aligned with the axial centerline axis 12 of the engine 10. In step 602, the actuator 118 may be operated (e.g., either manually by the ground support personnel 96 or by the controller 132) to translate the support structure 90 in the axial translation direction 92 (FIG. 2 and FIG. 3) so as to begin inserting the support structure 90 into the inlet duct 52. In a further aspect described below, at step 602, a second support structure 136 may be inserted in the bypass airflow passage 48 instead to perform deicing operations of the engine 10. In step 603, operation of the ground support deicing apparatus 80 may be started. Here, the starting of the ground support deicing apparatus 80 may mean to commence operations of the controller 132 to begin the deicing program 137 for removing ice from the component parts of the engine 10.

In removing ice from the component parts of the engine 10, in step 604, the controller 132 controls to operate the imaging device 126 (FIG. 3) so that the IR imaging sensors 130 obtain infrared image data of the component parts of the engine 10 (e.g., infrared image data of the inlet lip 62, infrared image data of the inner surface 70 of the inlet duct 52, infrared image data of the fan blades 42, and/or infrared image data of the spinner 43). As discussed above with regard to FIG. 5, the deicing program 137, and more particularly, the IR processing module 141, may provide signals to the image processing circuit 128 to obtain the image data, and the image processing circuit 128 may issue commands/signals to the IR imaging sensors 130. In step 605, the imaging device 126 may provide feedback in the form of image data back to the IR processing module 141. More particularly, based on the received commands/signals, the IR imaging sensors 130 provide image data to the image processing circuit 128, which provides the image data from the IR imaging sensors 130 back to the deicing program 137, and in particular, back to the IR processing module 141. The IR processing module 141 processes the received image data and may generate infrared images of the component part of the engine based on the received image data. The generated images may be displayed on the display 127 or on the mobile terminal 125 for viewing by the ground support personnel 96.

In-step 606, the controller 132, utilizing image data and/or the generated images (i.e., the feedback from the image processing circuit 128), detects the presence or the absence of ice on the component part of the ducted fan engine. Here, the IR processing module 141 may compare variations in the infrared images along the surfaces of the component part to detect that ice is present on the component part. The IR processing module 141 may also detect the thickness of the ice on the component part, and may detect the type of the component part and the location of the component part based on image data of the component parts of the engine that may be stored in a database associated with the deicing program 137.

In step 607, the controller 132 then determines, from the detected presence of ice, a frequency range for removal of the ice from the component part. Here, the IR processing module 141 may provide data to the sonic processing module 143, including data regarding the detected thickness of the ice, and the detected type and the detected location of the component part. Utilizing the data provided by the IR processing module 141, the sonic processing module 143 may then determine a frequency range for sonic waves to be emitted for removal of the ice from the component part.

In step 608, the controller 132, and more particularly, the sonic processing module 143, determines which of the plurality of sonic transmitters (e.g., which of the first sonic wave transmitters 86, which of the second sonic wave transmitters 88, and/or which of the third sonic wave transmitters 122 (FIG. 3)) is/are to be utilized for removing the ice from the component part. The sonic processing module 143 may then provide signals to the sonic wave processing circuit 129 (FIG. 5) for the determined sonic wave transmitter(s) to emit sonic waves in the determined frequency range. The sonic wave processing circuit 129 provides signals to the determined sonic wave transmitter(s) (e.g., the first sonic wave transmitters 86, the second sonic wave transmitters 88, and/or the third sonic wave transmitters 122), which emit sonic waves (e.g., the sonic waves 108, the sonic waves 112, the sonic waves 113, and/or the sonic waves 124) in the determined frequency range.

In step 609, the controller 132 receives feedback from the imaging device 126 (e.g., updated infrared image data) and feedback from the sonic transmitter(s). For example, the IR processing module 141 continuously or periodically (e.g., every 10 milliseconds) provides signals/commands to image processing circuit 128, which continuously/periodically proves the signals/commands to the IR imaging sensors 130 to continuously/periodically obtain image data. Thus, the IR processing module 141 can continuously or periodically update the infrared image data and the infrared images to detect changes in the presence or thickness of the ice on the component part due to the emission of the sonic waves. Similarly, the sonic wave transmitters 86, the sonic wave transmitters 88, and/or the sonic wave transmitters 122 may provide feedback (e.g., detected changes in reflected sonic waves due to changes in the presence or thickness of the ice on the component part) to the sonic wave processing module 143 so that the sonic processing module can continuously or periodically update the determined frequency range.

Next, in step 610, the controller 132 (e.g., the deicing program 137) determines if the ice has been removed from the component part. More particularly, the IR processing module 141 may determine, based on updated infrared image data, whether ice is still present on the component part, or if the ice has been removed from the component part. If the controller 132 determines that the ice has not been removed from the component part (NO in step 610), then the process loops back to return to step 604. If, on the other hand, the controller 132 determines that the ice has been removed from the component part, then, in step 611, the controller 132 controls the actuator 118 to translate and/or to rotate the support structure 90, and then to return the processing to step 604 to continue deicing the engine component parts. The time of the processing of step 604 through step 611 in any one loop may be such that a virtually continuous or periodic translation and/or rotation of the support structure 90 may be obtained.

Figure 7:
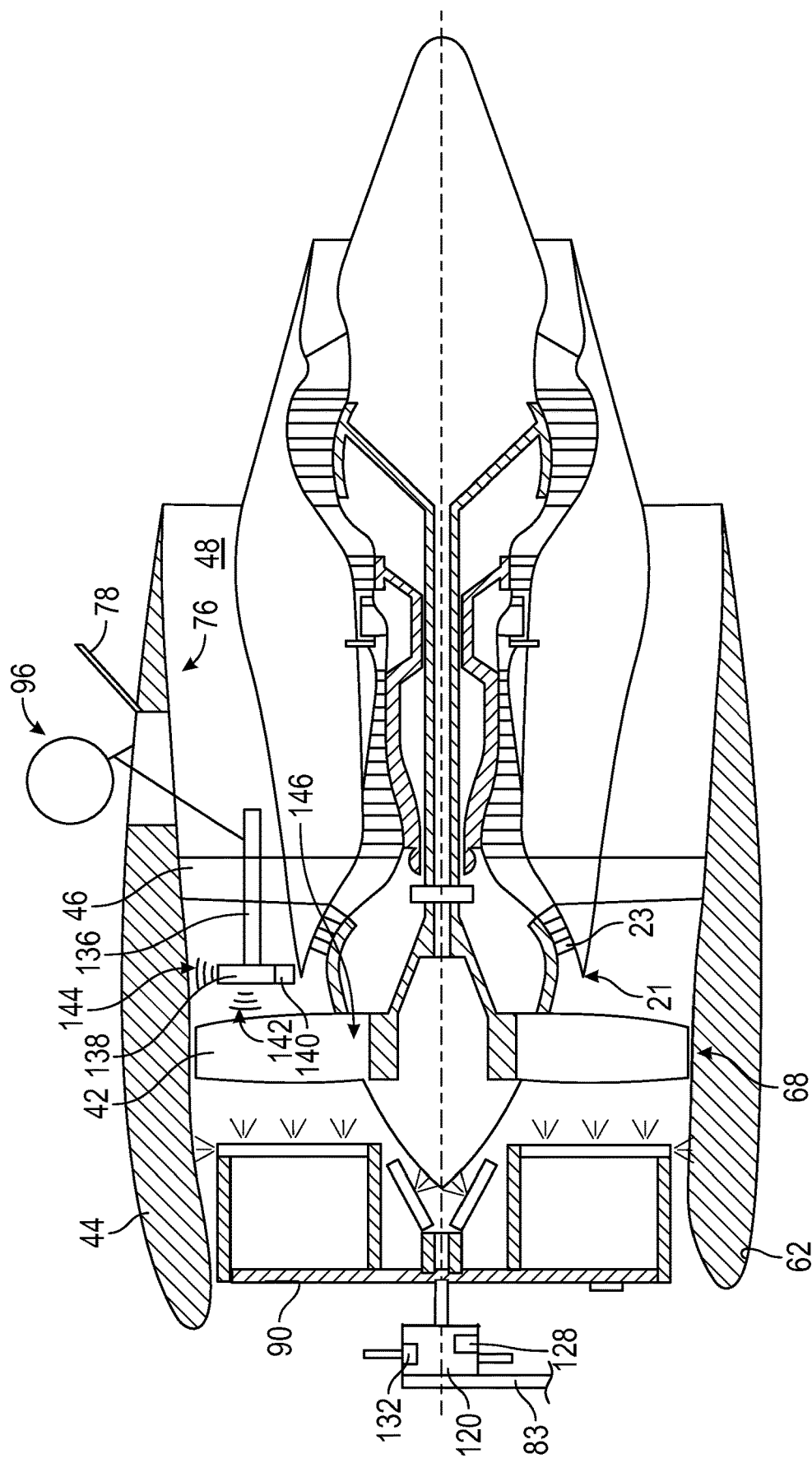
FIG. 7 depicts an example of a ground support structure inserted within the inlet duct of the engine, according to an aspect of the present disclosure.

FIG. 7 depicts an example of a support structure 90 inserted within the inlet duct 52 of the engine 10. In FIG. 7, the support structure 90 is shown after having been translated through the inlet duct 52 from the position shown in FIG. 2 until the support structure 90 reaches the fan section 68. In addition, in FIG. 7, the ground support deicing apparatus 80 further includes a second support structure 136, which may be a handheld structure that is separate from the support structure 90 and may be operated by the ground support personnel 96. More particularly, the second support structure 136 may be in the form of a wand that includes at least one third sonic wave transmitter 138 and at least one infrared imaging sensor 140. Both the third sonic wave transmitter 138 and the IR imaging sensor 140 may wirelessly communicate with the image processing circuit 128 and/or the controller 132 within the control box 120. Thus, while the above process steps of FIG. 6 may have been described based on the operation of the support structure 90, the same processing steps described in FIG. 6 may be implemented for the second support structure 136. As such, the image processing circuit 128 may wirelessly communicate with the at least one infrared imaging sensor 140, and the sonic wave processing circuit 129 may wirelessly communicate with the at least one third sonic wave transmitter 138. Thus, the IR imaging sensor 140 provides feedback to the image processing circuit 128 in the same manner as the IR imaging sensors 130 (FIG. 4). Similarly, the third sonic wave transmitter 138 receives and transmits signals from/to the controller 132, and emits sonic waves 142 and sonic waves 144 in the same manner as either the first sonic wave transmitters 86 or the second sonic wave transmitters 88. Accordingly, as a further processing for deicing the component parts of the engine 10, the ground support personnel 96 may open the access doors 78 of the nacelle 44 and insert the second support structure 136 into the bypass airflow passage 48 of the nacelle 44, and the controller 132 controls the at least one third sonic wave transmitter 138, based on the feedback from the IR imaging sensor 130 and feedback from the third sonic wave transmitter 138, to emit the sonic waves 142 and/or the sonic waves 144 in the determined frequency range to deice at least one component part within the bypass airflow passage 48 of the nacelle 44. Here, the at least one component part within the bypass airflow passage 48 of the nacelle 44 may include at least one of the bypass duct inner surface 76, the fan outlet guide vanes (or struts) 46, the low pressure compressor splitter 21, the low pressure compressor inlet guide vanes 23, and/or a downstream side 146 of fan blades 42 of the fan assembly 14.

The foregoing aspects of the ground support deicing apparatus provides a technique for removing ice from component parts of the turbine engine using sonic waves to break up the ice. As a result, the need to utilize deicing chemical agents on the engine parts to perform deicing can be eliminated, thereby reducing the potential for such chemicals to damage the internal component parts of the engine. Further, by virtue of implementing infrared imaging technology in the deicing process, the ground support personnel can more readily confirm the absence of ice on the engine component parts prior to engine startup.

While the foregoing description relates generally to a gas turbine engine, the gas turbine engine may be implemented in various environments or for various types of engines. For example, the engine may be implemented in an aircraft, but may be electrically driven instead of gas powered. The engine may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A ground support deicing apparatus for a ducted fan engine, the ground support deicing apparatus including a support structure, a control box including a controller having a processor and a memory that stores a deicing program executable by the processor to control the ground support deicing apparatus, a plurality of sonic wave transmitters connected to the support structure and arranged to communicate with the controller, and an imaging device including a plurality of imaging sensors connected to the support structure and arranged to communicate with the controller, wherein the deicing program, when executed by the processor, causes the controller to control (a) providing imaging signals to obtain image data from the plurality of imaging sensors, (b) receiving image data provided by each of the plurality of imaging sensors, and generating images of at least one component part of the ducted fan engine, (c) detecting, via at least one of the received image data and/or the generated images, a presence or an absence of ice on the at least one component part of the ducted fan engine, and (d) controlling, based on detecting the presence of ice on the at least one component part, the plurality of sonic wave transmitters to emit sonic waves in a given frequency range so as to remove the ice from the at least one component part of the ducted fan engine.

The ground support deicing apparatus according to the preceding clause, wherein the ground support deicing apparatus is mounted to a ground support vehicle.

The ground support deicing apparatus according to any preceding clause, wherein the ground support deicing apparatus is a handheld apparatus operable by ground support personnel.

The ground support deicing apparatus according to any preceding clause, wherein the deicing program further causes the controller to control translating the support structure from an inlet lip of an inlet duct of the ducted fan engine through the inlet duct to a fan section of the inlet duct.

The ground support deicing apparatus according to any preceding clause, wherein the imaging device is an infrared imaging device that includes a plurality of infrared imaging sensors, and the controller further determines the given frequency range of respective ones of the plurality of sonic wave transmitters based on at least one of the received image data and the generated images, the given frequency range being a range between eight kilohertz and two hundred kilohertz.

The ground support deicing apparatus according to any preceding clause, wherein the support structure includes a first circumferential structure, and at least one first sonic wave transmitter among the plurality of sonic wave transmitters is connected to the first circumferential structure.

The ground support deicing apparatus according to any preceding clause, wherein the first circumferential structure is radially expandable so as to adjust a diametric size of the first circumferential structure according to a diametric size of an inlet duct of the ducted fan engine.

The ground support deicing apparatus according to any preceding clause, wherein the at least one first sonic wave transmitter is arranged to emit sonic waves against an inner surface of an inlet duct of the ducted fan engine.

The ground support deicing apparatus according to any preceding clause, wherein the support structure further includes a second circumferential structure arranged inward of and coaxial with the first circumferential structure, and at least one second sonic wave transmitter among the plurality of sonic wave transmitters is connected to the second circumferential structure.

The ground support deicing apparatus according to any preceding clause, wherein the at least one first sonic wave transmitter is arranged between the first circumferential structure and the second circumferential structure, and the at least one second sonic wave transmitter is angularly adjustable with respect to a centerline axis of the second circumferential structure.

The ground support deicing apparatus according to any preceding clause, wherein the at least one first sonic wave transmitter is arranged to emit sonic waves toward an inner surface of the inlet duct and/or to emit sonic waves toward fan blades of a fan assembly of the ducted fan engine.

The ground support deicing apparatus according to any preceding clause, wherein the at least one second sonic wave transmitter is arranged to emit sonic waves toward a spinner of the fan assembly, and being angularly adjusted based on a profile of the spinner.

The ground support deicing apparatus according to any preceding clause, wherein the deicing program further causes the control to determine the given frequency range based on the image data, and control the given frequency range for respective ones of the plurality of sonic wave transmitters, the given frequency range being a range between eight kilohertz and two hundred kilohertz.

The ground support deicing apparatus according to any preceding clause, wherein, in determining the given frequency range, the controller determines a thickness of the ice on the at least one component part, and determines a type of component part of the ducted fan engine.

The ground support deicing apparatus according to any preceding clause, wherein the ground support deicing apparatus further includes a second support structure that includes at least one second imaging sensor and at least one third sonic wave transmitter, the second support structure being inserted into a bypass flow passage of the ducted fan engine, and the deicing program further causing the controller to control the at least one second imaging sensor to obtain image data of at least one component part of the ducted fan engine, and to control the at least one third sonic wave transmitter to emit sonic waves in the given frequency range to deice the at least one component part within the bypass flow passage.

The ground support deicing apparatus according to any preceding clause, wherein the at least one component part within the bypass flow passage includes at least one of a bypass duct inner surface, fan outlet guide vanes, a low pressure compressor splitter, low pressure compressor inlet guide vanes, and a downstream side of fan blades of a fan assembly.

A method of deicing a ducted fan engine, the method being implemented utilizing a ground support deicing apparatus inserted into an inlet duct of a nacelle of the ducted fan engine, the ground support deicing apparatus including a support structure, a plurality of sonic wave transmitters connected to the support structure and communicating with a sonic wave processing circuit, an imaging device including a plurality of imaging sensors and an image processing circuit, and a controller, the method including providing, by the controller, imaging signals to the image processing circuit to obtain image data from the plurality of imaging sensors, receiving, by the image processing circuit, image data provided by each of the plurality of imaging sensors, and generating, by the controller, images of at least one component part of the ducted fan engine, detecting, by the controller, via at least one of the received image data and/or the generated images, a presence or an absence of ice on the at least one component part of the ducted fan engine, and controlling, by the controller, based on the detecting step detecting the presence of ice on the at least one component part, the plurality of sonic wave transmitters to emit sonic waves in a given frequency range so as to remove the ice detected in the detecting step from the at least one component part of the ducted fan engine.

The method according to the preceding clause, wherein the imaging device is an infrared imaging device that includes a plurality of infrared imaging sensors, and in the receiving step, the image data is infrared image data, and the generating generates infrared images of the at least one component part of the ducted fan engine.

The method according to any preceding clause, further including determining, by the controller, the given frequency range based on the image data, and controlling the plurality of sonic wave transmitters to transmit the sonic waves in the determined frequency range.

The method according to any preceding clause, wherein the controller determines, from the image data, a thickness of the ice on the at least one component part, and determines the given frequency range based on the determined thickness.

The method according to any preceding clause, further including the controller controlling translating and/or rotating the ground support structure within an inlet duct of the ducted fan engine.

The method according to any preceding clause, wherein the ground support deicing apparatus further includes a second support structure having at least one second imaging sensor and at least one third sonic wave transmitter, the second support structure being inserted into a bypass flow passage of the ducted fan engine, the method further including the controller controlling the at least one second imaging sensor to obtain image data of at least one component part of the ducted fan engine, and controlling the at least one third sonic wave transmitter to emit sonic waves in the given frequency range to deice the at least one component part within the bypass flow passage.

A non-transitory computer-readable medium on which is stored computer-executable code of a deicing program for deicing a ducted fan engine, the computer-executable code comprising code to cause a controller to execute providing imaging signals to the image processing circuit to obtain image data from the plurality of imaging sensors, receiving image data provided by each of a plurality of imaging sensors, and generating images of at least one component part of the ducted fan engine, detecting, via at least one of the received image data and/or the generated images, a presence or an absence of ice on the at least one component part of the ducted fan engine, and controlling, based on detecting the presence of ice on the at least one component part, a plurality of sonic wave transmitters to emit sonic waves in a given frequency range so as to remove the ice detected in the detecting step from the at least one component part of the ducted fan engine.

The non-transitory computer-readable medium according to the preceding clause, wherein in the receiving, the image data is infrared image data, and the generating generates infrared images of at least one component part of the ducted fan engine.

The non-transitory computer-readable medium according to any preceding clause, further including determining the given frequency range based on the image data, and controlling the plurality of sonic wave transmitters to transmit the sonic waves in the determined frequency range.

The non-transitory computer-readable medium according to any preceding clause, further including determining, from the image data, a thickness of the ice on the at least one component part, and determining the given frequency range based on the determined thickness.

The non-transitory computer-readable medium according to any preceding clause, further including controlling translating and/or rotating a ground support structure within an inlet duct of the ducted fan engine.

The non-transitory computer-readable medium according to any preceding clause, further including controlling the at least one second imaging sensor to obtain image data of at least one component part of the ducted fan engine, and controlling at least one third sonic wave transmitter to emit sonic waves in the given frequency range to deice the at least one component part within the bypass flow passage.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

We claim:

1. A ground support deicing apparatus for a ducted fan engine, the ground support deicing apparatus comprising:
    a support structure;
    a control box including a controller having a processor and a memory that stores a deicing program executable by the processor to control the ground support deicing apparatus;
    a plurality of sonic wave transmitters connected to the support structure and arranged to communicate with the controller; and
    an imaging device including a plurality of imaging sensors connected to the support structure and arranged to communicate with the controller,
    wherein the deicing program, when executed by the processor, causes the controller to control: (a) providing imaging signals to obtain image data from the plurality of imaging sensors, (b) receiving image data provided by each of the plurality of imaging sensors, and generating images of at least one component part of the ducted fan engine, (c) detecting, via at least one of the received image data and/or the generated images, a presence or an absence of ice on the at least one component part of the ducted fan engine, and (d) controlling, based on detecting the presence of ice on the at least one component part, the plurality of sonic wave transmitters to emit sonic waves in a given frequency range so as to remove the ice from the at least one component part of the ducted fan engine.

2. The ground support deicing apparatus according to claim 1, wherein the ground support deicing apparatus is mounted to a ground support vehicle.

3. The ground support deicing apparatus according to claim 1, wherein the ground support deicing apparatus is a handheld apparatus operable by ground support personnel.

4. The ground support deicing apparatus according to claim 1, wherein the deicing program further causes the controller to control translating the support structure from an inlet lip of an inlet duct of the ducted fan engine through the inlet duct to a fan section of the inlet duct.

5. The ground support deicing apparatus according to claim 1, wherein the imaging device is an infrared imaging device that includes a plurality of infrared imaging sensors, and the controller further determines the given frequency range for respective ones of the plurality of sonic wave transmitters based on at least one of the received image data and the generated images, the given frequency range being a range between eight kilohertz and two hundred kilohertz.

6. The ground support deicing apparatus according to claim 1, wherein the support structure includes a first circumferential structure, and at least one first sonic wave transmitter among the plurality of sonic wave transmitters is connected to the first circumferential structure.

7. The ground support deicing apparatus according to claim 6, wherein the first circumferential structure is radially expandable so as to adjust a diametric size of the first circumferential structure according to a diametric size of an inlet duct of the ducted fan engine.

8. The ground support deicing apparatus according to claim 6, wherein the at least one first sonic wave transmitter is arranged to emit sonic waves against an inner surface of an inlet duct of the ducted fan engine.

9. The ground support deicing apparatus according to claim 6, wherein the support structure further includes a second circumferential structure arranged inward of and coaxial with the first circumferential structure, and at least one second sonic wave transmitter among the plurality of sonic wave transmitters is connected to the second circumferential structure.

10. The ground support deicing apparatus according to claim 9, wherein the at least one first sonic wave transmitter is arranged between the first circumferential structure and the second circumferential structure, and the at least one second sonic wave transmitter is angularly adjustable with respect to a centerline axis of the second circumferential structure.

11. The ground support deicing apparatus according to claim 10, wherein the at least one first sonic wave transmitter is arranged to emit sonic waves toward an inner surface of an inlet duct and/or to emit sonic waves toward fan blades of a fan assembly of the ducted fan engine.

12. The ground support deicing apparatus according to claim 11, wherein the at least one second sonic wave transmitter is arranged to emit sonic waves toward a spinner of the fan assembly, and being angularly adjusted based on a profile of the spinner.

13. The ground support deicing apparatus according to claim 1, wherein the deicing program further causes the control to determine the given frequency range based on the image data, and control the given frequency range for respective ones of the plurality of sonic wave transmitters, the given frequency range being a range between eight kilohertz and two hundred kilohertz.

14. The ground support deicing apparatus according to claim 13, wherein, in determining the given frequency range, the controller determines a thickness of the ice on the at least one component part, and determines a type of component part of the ducted fan engine.

15. The ground support deicing apparatus according to claim 1, wherein the ground support deicing apparatus further includes a second support structure that includes at least one second imaging sensor and at least one third sonic wave transmitter, the second support structure being inserted into a bypass flow passage of the ducted fan engine, and the deicing program further causing the controller to control the at least one second imaging sensor to obtain image data of at least one component part of the ducted fan engine, and to control the at least one third sonic wave transmitter to emit sonic waves in the given frequency range to deice the at least one component part within the bypass flow passage.

16. The ground support deicing apparatus according to claim 15, wherein the at least one component part within the bypass flow passage includes at least one of a bypass duct inner surface, fan outlet guide vanes, a low pressure compressor splitter, low pressure compressor inlet guide vanes, and a downstream side of fan blades of a fan assembly.

17. A method of deicing a ducted fan engine, the method being implemented utilizing a ground support deicing apparatus inserted into an inlet duct of a nacelle of the ducted fan engine, the ground support deicing apparatus including a support structure, a plurality of sonic wave transmitters connected to the support structure and communicating with a sonic wave processing circuit, an imaging device including a plurality of imaging sensors and an image processing circuit, and a controller, the method comprising:
providing, by the controller, imaging signals to the image processing circuit to obtain image data from the plurality of imaging sensors;
receiving, by the image processing circuit, image data provided by each of the plurality of imaging sensors, and generating, by the controller, images of at least one component part of the ducted fan engine;
detecting, by the controller, via at least one of the received image data and/or the generated images, a presence or an absence of ice on the at least one component part of the ducted fan engine; and
controlling, by the controller, based on the detecting step detecting the presence of ice on the at least one component part, the plurality of sonic wave transmitters to emit sonic waves in a given frequency range so as to remove the ice detected in the detecting step from the at least one component part of the ducted fan engine.

18. The method according to claim 17, wherein the imaging device is an infrared imaging device that includes a plurality of infrared imaging sensors, and in the receiving step, the image data is infrared image data, and the generating generates infrared images of the at least one component part of the ducted fan engine.

19. The method according to claim 17, further comprising determining, by the controller, the given frequency range based on the image data, and controlling the plurality of sonic wave transmitters to transmit the sonic waves in the determined given frequency range.

20. The method according to claim 19, wherein the controller determines, from the image data, a thickness of the ice on the at least one component part, and determines the given frequency range based on the determined thickness of the ice on the at least one component part.

* * * * *